Feb. 12, 1924.  1,483,743
F. H. PAGE
SOIL PULVERIZER
Filed May 13, 1922   2 Sheets-Sheet 2

WITNESSES

INVENTOR
Frank H. Page
BY
ATTORNEYS

Patented Feb. 12, 1924.

1,483,743

UNITED STATES PATENT OFFICE.

FRANK H. PAGE, OF WAVERLY, IOWA.

SOIL PULVERIZER.

Application filed May 13, 1922. Serial No. 560,686.

*To all whom it may concern:*

Be it known that I, FRANK H. PAGE, a citizen of the United States of America, and a resident of Waverly, in the county of Bremer and State of Iowa, have invented a new and Improved Soil Pulverizer, of which the following is a description.

My invention relates to a soil pulverizer adapted to be drawn over a field by draft animals and especially relates to a soil pulverizer having a novel arrangement of pulverizing shovels and operating means therefor, as well as novel means to raise and lower the shovels and otherwise control the operation of the machine.

The general object of my invention is to provide a rotary shovel assemblage operating to effect the lifting motion on the soil and the weeds and roots thereof and to otherwise improve the machine in various particulars.

The nature of the invention and its distinguishing features and advantages will clearly appear as the description proceeds.

Reference is to be had to the accompanying drawings forming a part of this specification, it being understood that the drawings are merely illustrative of one example of the invention.

Figure 1:
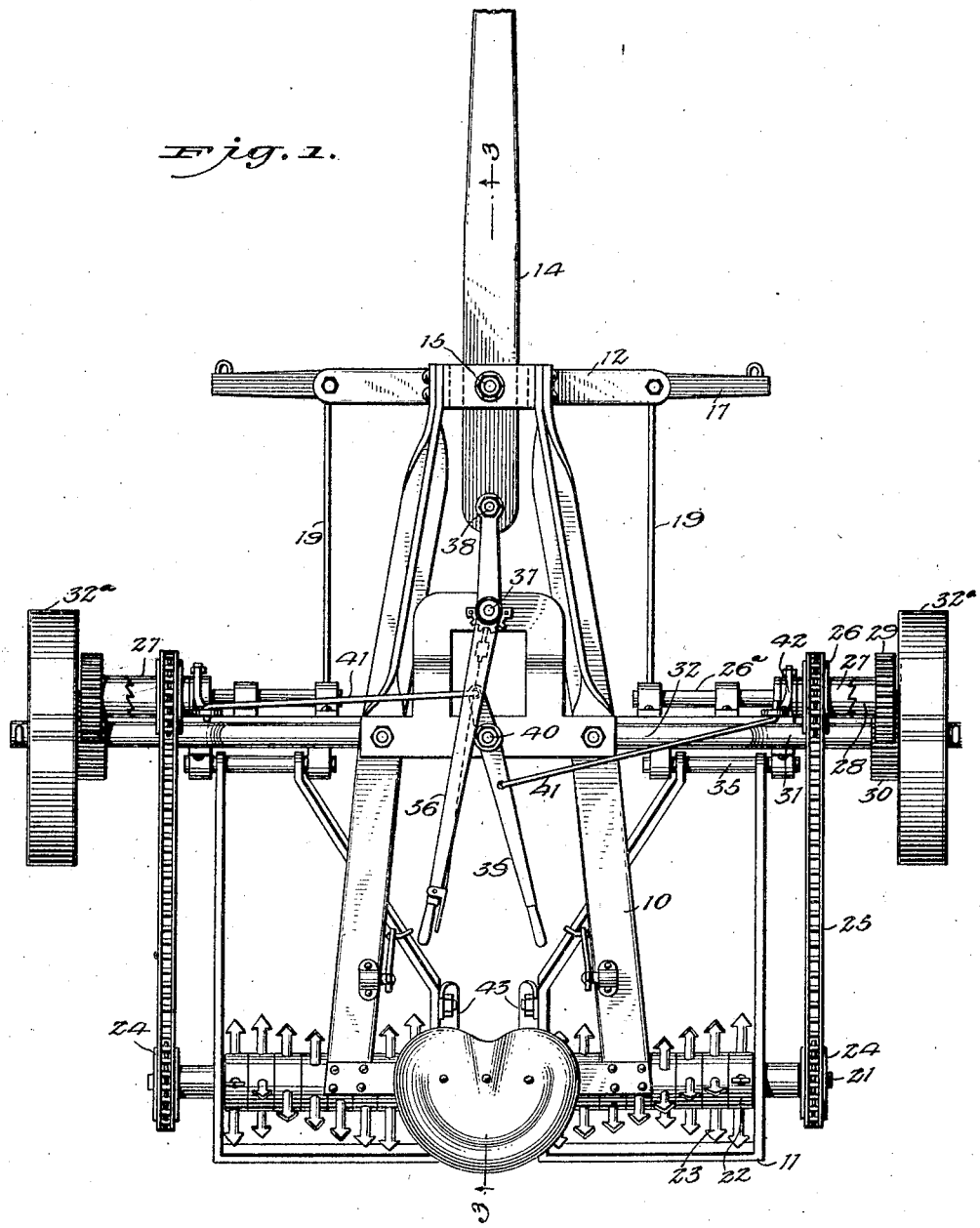
Figure 1 is a plan view of a soil pulverizer embodying my invention.
Figure 2:
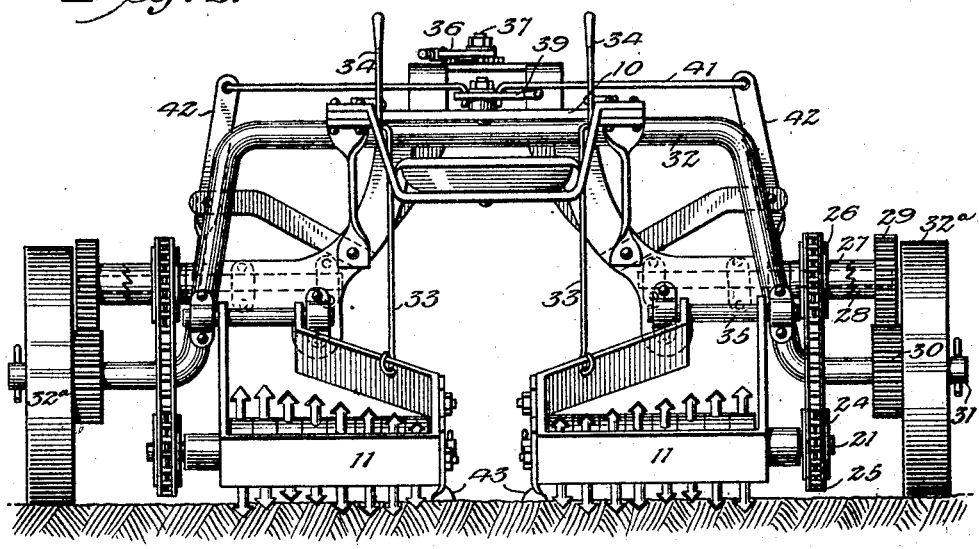
Figure 2 is a rear elevation thereof.
Figure 3:
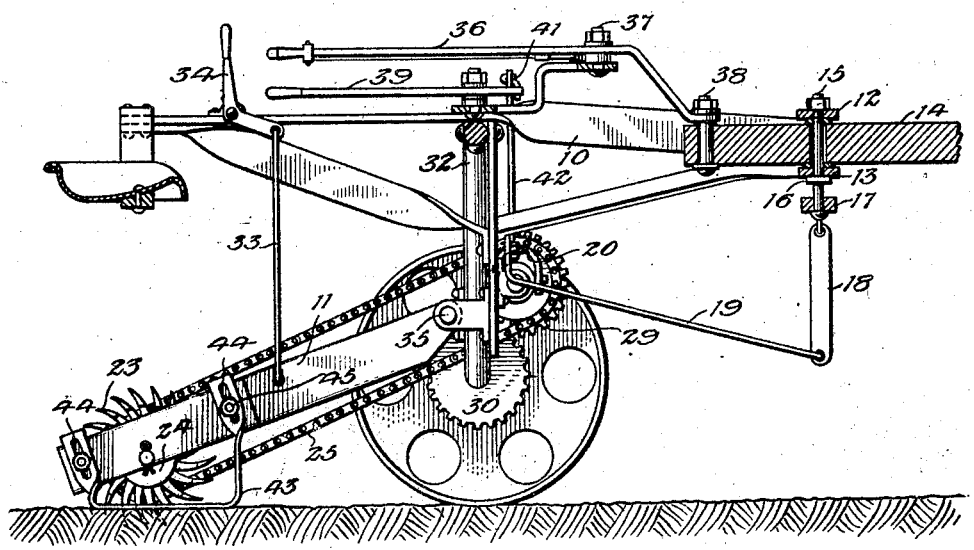
Figure 3 is a longitudinal vertical section as indicated by the line 3—3, Figure 1.

In carrying out my invention in accordance with the illustrated example, a suitable frame 10 is provided having pivoted thereto an auxiliary frame 11 at the rear adapted to rock vertically. At the front the frame 10 includes upper and lower cross bars 12, 13 extending transversely of the longitudinal members of the frame and spaced vertically. A vertical pivot bolt 15 extends through the transverse members 12, 13 and projects at the lower end below the lower member 13. Said pivot bolt has a fixed collar 16 at the under side of the lower transverse frame member 13 and said bolt below the collar 16 passes loosely through a draft tree 17 so that said draft tree may turn to various angular positions with the bolt 15 as a center. Links 18 are pivotally connected at their upper ends with said draft bar 17 near the ends of the latter, and the lower ends of said links are pivotally connected with brace rods 19, the arrangement permitting a turning of the draft bar within the limits allowed by the links 18. The links 18 are shown as fixedly secured at their upturned rear ends by bolts 20 (see Figure 3).

The shovel assemblage and the drive means therefor are as follows: On a transverse shaft 21 are secured a plurality of separate hubs 22 each of which is provided with radial shovels 23. The drive assemblage is the same at each end of the shovel shaft 21 and is as follows: A sprocket pulley 24 is provided on said shaft 21 outside of the auxiliary frame 11. A chain 25 runs over said pulley and forwardly and about a sprocket pulley 26 on a transverse shaft 26$^a$. The hub of the pulley 26 has a clutch element 27 adapted to engage a clutch element 28 on a pinion 29 on shaft 26$^a$ which pinion meshes with a pinion 30 on the spindle 31 of the arched axle 32 carrying the running wheels 32$^a$. To raise and lower the auxiliary frame 11 and the shovel assemblage, said frame is suspended on approximately vertical link rods 33, the upper ends of which are connected with a bellcrank lever 34 the rocking of which will raise or lower the shovels. The auxiliary frames 11 are hung upon separate transverse shafts 35 near the opposite sides of the machine.

The tongue 14 is adapted to be swung from side to side with the bolt 15 as an axis through the medium of a lever 36 fulcrumed on a vertical pin 37 and pivoted as at 38 and forward of said fulcrum to the said tongue 14 rearward of the pivot 15.

A lever 35 is adapted to control both clutches 27, said lever being fulcrumed by a vertical bolt 40 and connecting by rods 41 with clutch-operating elements 42 adapted to shift the clutch elements 27 into or out of engagement with the mating elements 28.

Each frame 11 for the shovel assemblage is provided with a shoe 43, the ends of which are upturned and have a slot and pin connection with the frame 11 to adjust the height of the shoe and thereby regulate the depth of the shovels. Vertical slots 44 are indicated in each shoe 43 through which slots clamp bolts 45 pass.

The various hubs 22 in the shovel assemblage are so disposed that their radial shovels 23 will be disposed in spiral series to engage the ground in such succession as to lift the soil and throw the weeds and roots upwardly. By reason of the intermediate pinion 29 the chain 25 will be driven in such a direction as to turn the shovels in a reverse direction from the running wheels 32ª and to effect a thorough lifting of the soil upwardly at the front of shaft 21.

I would state in conclusion that while the illustrated example constitutes a practical embodiment of my invention, I do not limit myself strictly to the exact details herein illustrated, since, manifestly, the same can be considerably varied without departure from the spirit of the invention as defined in the appended claims.

Having thus described my invention, I claim:

1. In an implement of the class described, a wheeled axle, a shaft having radially disposed shovels thereon, a sprocket wheel on said shaft, a pinion on the axle adapted to turn with the turning of one of the wheels, a shaft adjacent the axle, a sprocket wheel on the last-mentioned shaft, a chain running over said sprockets, a pinion on the last-mentioned shaft meshing with the pinion on the axle, and means to clutch or unclutch the second-mentioned pinion and the second-mentioned sprocket.

2. In an implement of the class described, a supporting frame, wheels for said supporting frame, a second frame pivotally mounted on said supporting frame, a stub-shaft also mounted on said frame, said stub-shaft carrying a sprocket wheel, a clutch sleeve and a gear having connection with one of said wheels, a rotary shovel assemblage mounted on said pivoted frame, a sprocket wheel at the end of said rotary shovel assemblage, a sprocket chain between the sprocket wheel on the stub-shaft and the sprocket wheel on the assemblage, a lever pivoted on said supporting frame, and a rod extending between the clutch sleeve and said lever to clutch or unclutch said clutch sleeve with said gear, to control the operation of said shovel assemblage.

FRANK H. PAGE.